Aug. 7, 1956 E. B. NOLT ET AL 2,757,599
WIRE TWISTING MECHANISM FOR A HAY BALER
Filed Oct. 30, 1952 6 Sheets-Sheet 1

INVENTORS
Edwin B. Nolt
John P. Tarbox
By Richard E. Babcock Jr.
ATTORNEY

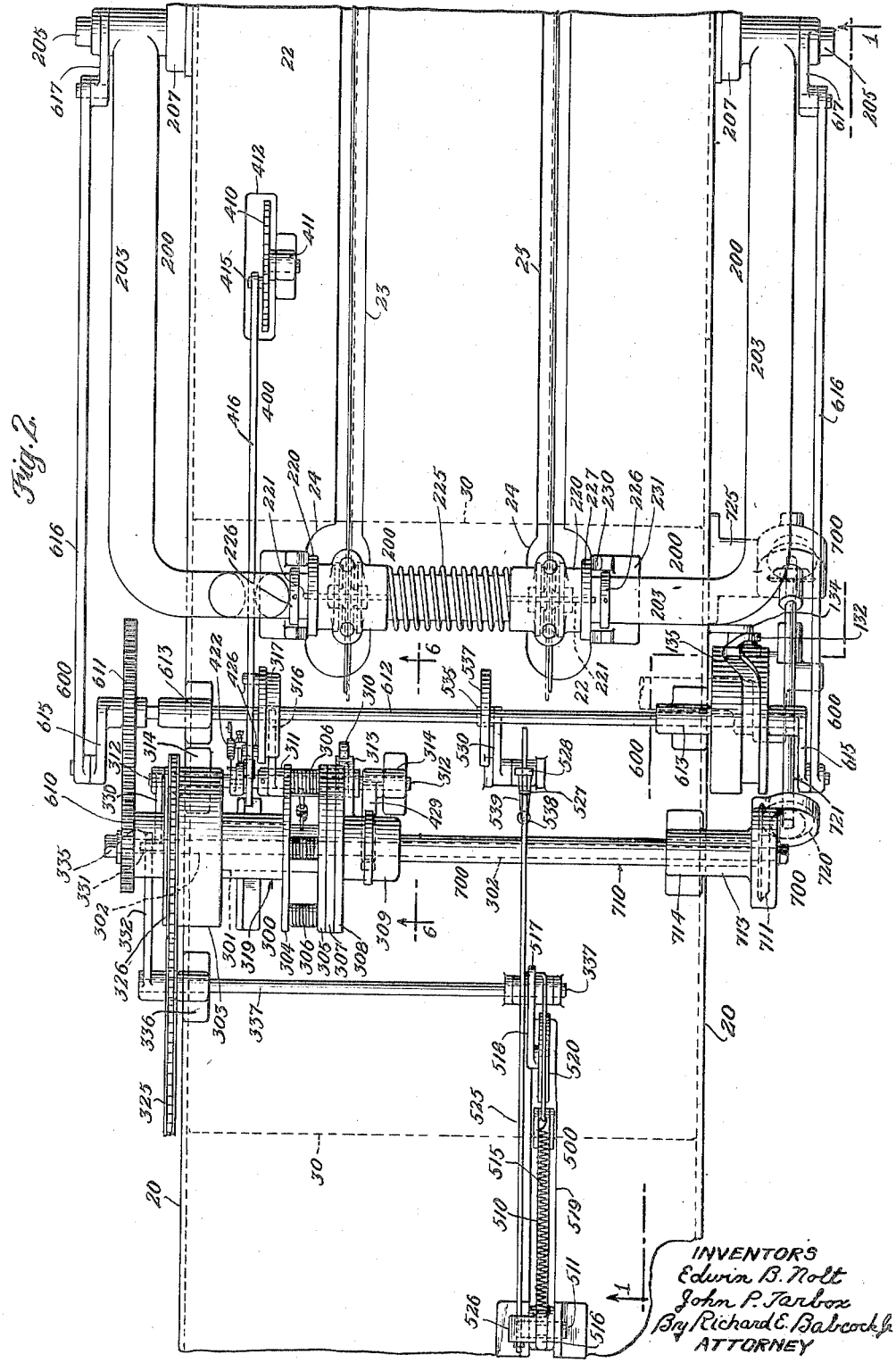

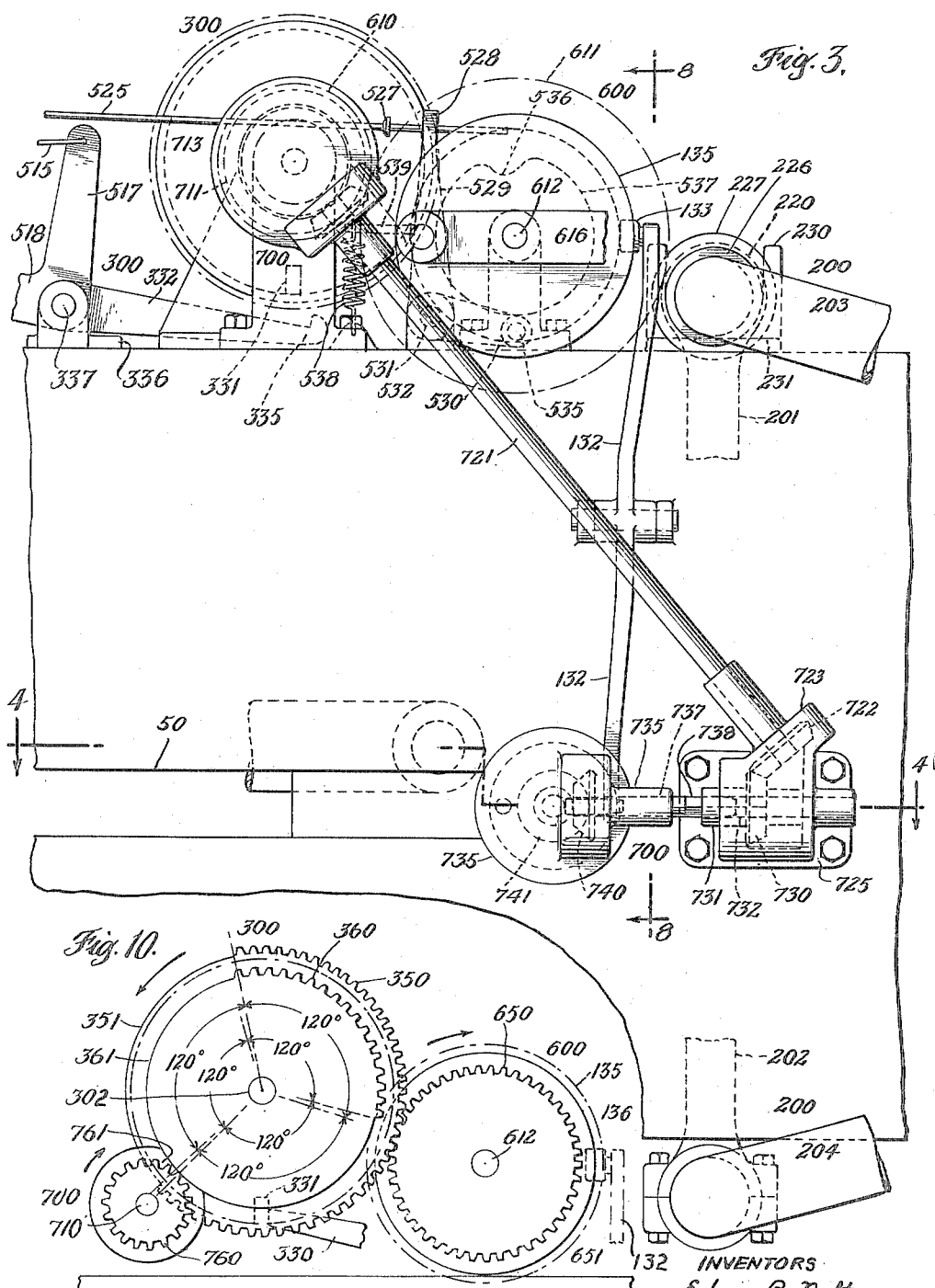

Aug. 7, 1956   E. B. NOLT ET AL   2,757,599
WIRE TWISTING MECHANISM FOR A HAY BALER
Filed Oct. 30, 1952   6 Sheets-Sheet 4
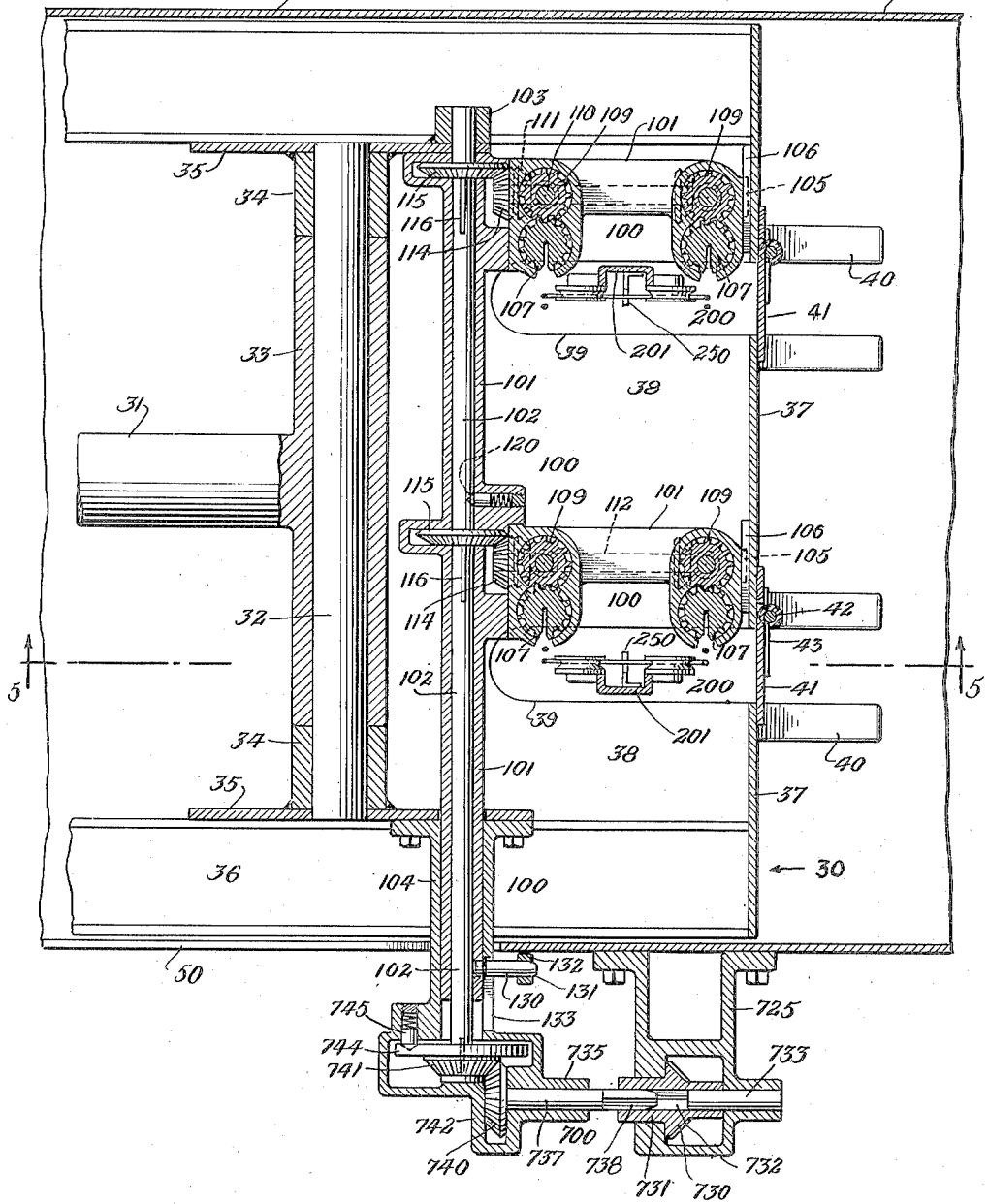
INVENTORS
Edwin B. Nolt
John P. Tarbox
By Richard E. Babcock Jr.
ATTORNEY

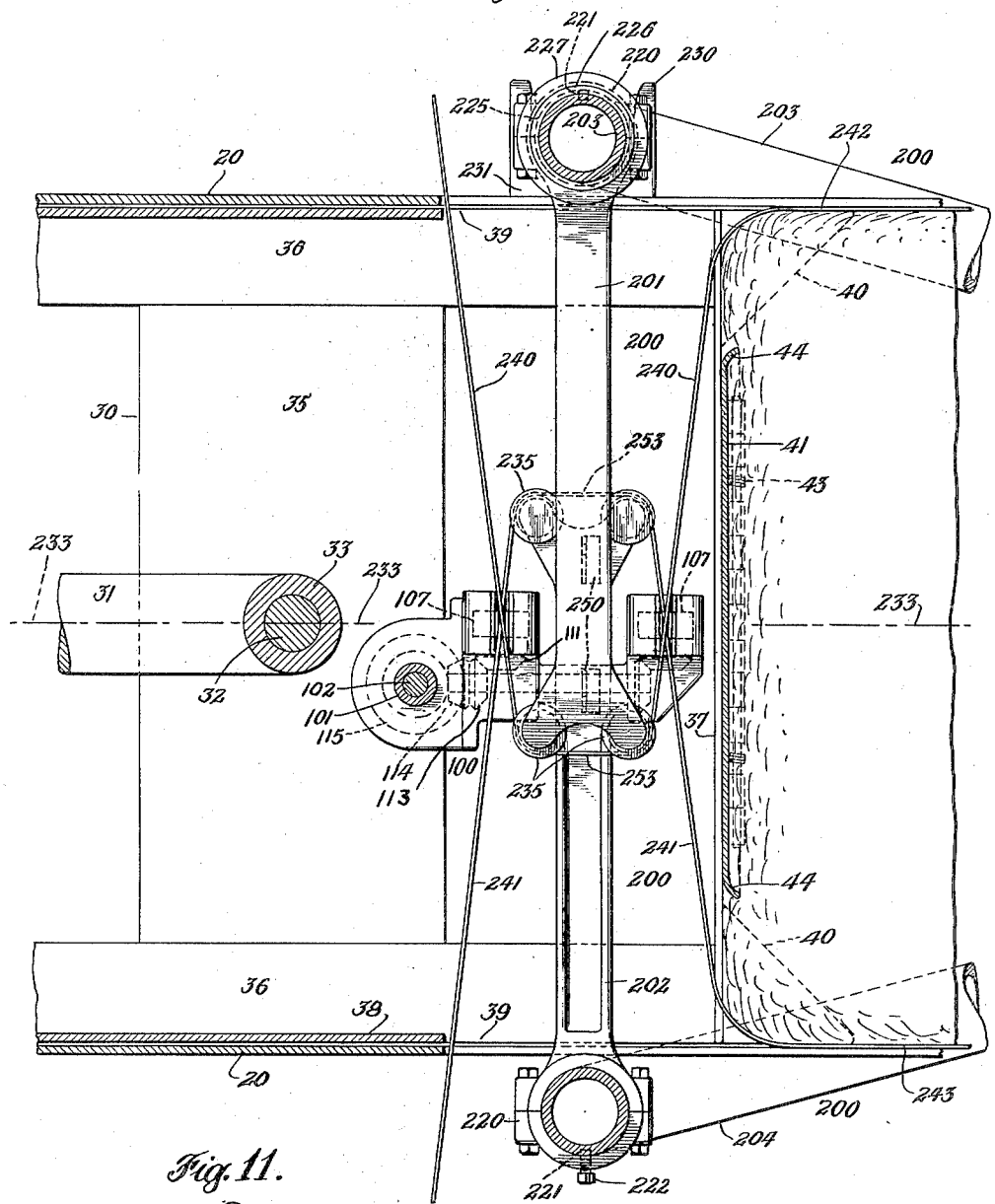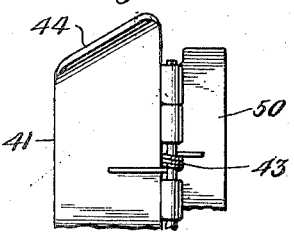

Aug. 7, 1956  E. B. NOLT ET AL  2,757,599
WIRE TWISTING MECHANISM FOR A HAY BALER
Filed Oct. 30, 1952  6 Sheets-Sheet 6
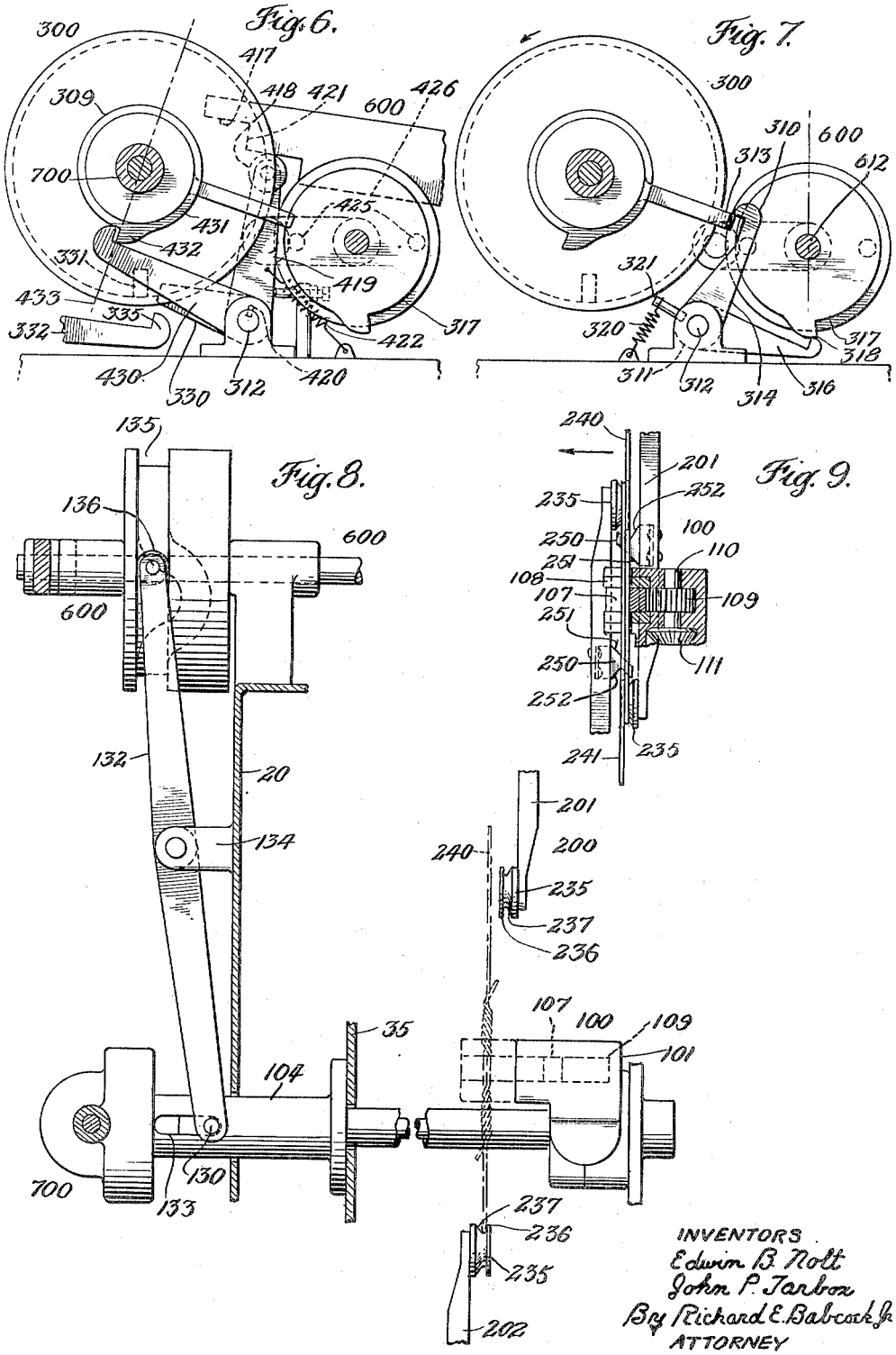
INVENTORS
Edwin B. Nolt
John P. Tarbox
By Richard E. Babcock Jr.
ATTORNEY United States Patent Office 2,757,599
Patented Aug. 7, 1956

2,757,599

WIRE TWISTING MECHANISM FOR A HAY BALER

Edwin B. Nolt, New Holland, and John P. Tarbox, Philadelphia, Pa., assignors, by mesne assignments, to Sperry Rand Corporation, New Holland, Pa., a corporation of Delaware Application October 30, 1952, Serial No. 317,628

12 Claims. (Cl. 100—4)

Our invention consists of a method and a mechanism for achieving double twist wire ties at the ends of bales instead of the sides of bales. Bales are commonly handled from the sides and commonly tied upon their sides. Applying the tie to the ends not only avoids damage to one's hands during handling, but also prevents injury to one's feet when one walks over the tops of flat sides of the stored bales, especially when the handlers are barefoot, or when barefoot chlidren play over stored bales.

An important aim of the invention is the simplification of the mechanism as a whole to such extents as to markedly improve the reliability and durability of the mechanism and at the same time attain an economy of manufacture which will considerably lessen first cost.

The method of our invention contributes to all of these ends. Two wire spools per bale band are utilized, one for each side of the bale. A loop is projected from each of these spools into the body of the bale case through the body of the plunger. The bights of these loops are projected beyond each other on either side of the medial plane of the bale and the corresponding sides of the loops brought into close overlapping relation to each other. The two pairs of overlapped sides are thereupon respectively twisted together thus simultaneously forming two twists or ties. Finally the loops are cut at the bights, thus severing the two ties from each other and permitting the forward one to fall to the rear end of the completed bale being banded, while the rearward one secures together the ends of the wires from the spools to form the bale loop of a band for a new bale.

The mechanism for carrying out this method we embody in twisters per se carried in the plunger of the baler; in loop forming needles on each side of the bale case adapted for coaction with each other to project the loops from opposite sides of the case into the body of the plunger and into proper relation to the plunger carried twisters and to each other; in timing mechanism for the needles under the coordinated control of bale metering means, plunger stop means, needle means, and twister means; in timing mechanism for the twisting means under the control of the needle mechanism; and in cutting means for the bights of the loops carried and operated by the needles themselves.

In the accompanying drawings we show two embodiments of our invention as a mechanism but only one embodiment in its entirety. These represent the best embodiments now known to us but obviously there are others.

Of the drawings—

Figures 1 to 9 pertain to the first modification, an embodiment in which the timing of the various portions of the mechanism is achieved by clutches of the one revolution and stop type which are correlated to each other through various dog arrangements, while Figure 10 pertains to the second embodiment, one in which instead of timing through the use of correlated one revolution and stop clutches the timing is achieved by means of segmental gears of a type commonly used in obtaining intermittent motions of various interrelations. Referring then first to Figures 1 to 9—

Figure 1 is a side elevation in partial section (being taken approximately on line 1—1 of Figure 2) of the mechanism as applied to the bale case of an automatic baling machine. It is an elevation from the right hand side of the machine considered as one looks forwardly, that is to say in the direction of formation of the bale and its delivery from the machine. In this view the parts are shown in the relations they occupy when the needles are substantially all the way in, just about to come to rest, and the baling plunger is substantially all the way forward, a relationship brought about through the completion of a bale ready for tying.

Figure 2 is a plan view showing the parts in the same relationship as that in Figure 1. In it the twister gear shift cam appears in plan, just as it is about to move the twister gears in to achieve the lay.

Figure 3 is an enlarged side elevation of the twister operating and drive mechanism.

Figure 4 is a horizontal section of the twister taken approximately on line 4—4 of Figure 3. In both this view and that of Figure 3 the twister gears are just ready to move into wire engaging position.

Figure 5 is an enlarged vertical longitudinal cross-section taken just to the right (looking forwardly) of the upper needle of the right hand pair of needles, also showing the parts in the same relationship as in Figure 1.

Figure 6 is a trans axial cross-section of the timing mechanism taken substantially on line 6—6 of Figure 2 looking in the direction of the arrows, and showing the control interrelationship between the needle and twister clutches, the metering wheel and the plunger latch, certain parts normally showing in such a cross-section being omitted for the sake of clarity.

Figure 7 is a similar cross-section showing parts omitted from Figure 6, which parts are those entering into control exercised by the needle drive over the twister clutch. The positions are those occupied by the same parts in Figure 1, just as the needles approach their ultimate positions and the lay is to commence.

Figure 1:
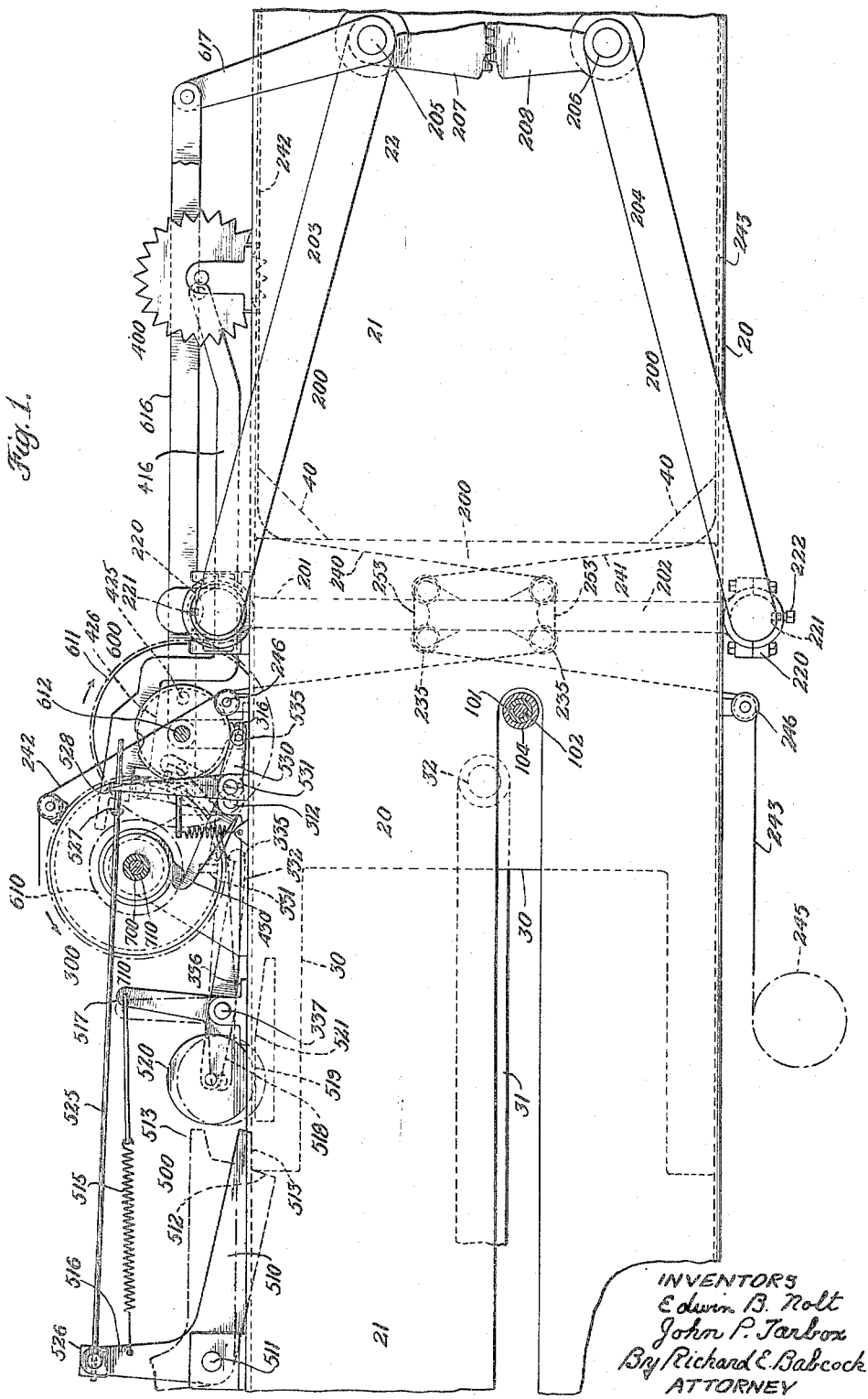

Figure 8 is a vertical cross-section elevation taken substantially on line 8—8 of Figure 3 looking in the direction of the arrows and showing the parts of the twister shifting mechanism in the relationship they have with respect to the needles and the needle drive as the needles draw toward their extreme retracted position following the completion of a tie. Only the left hand pair of needles is illustrated, those at the right being broken away. It is to be borne in mind that when we speak of left and right we are looking forwardly, that is to say in the direction of delivery of the bale.)

Figure 9 is a vertical cross-sectional elevation showing the pair of needles appearing in Figure 8 and the associated twister in the relative positions they occupy at the time of making the tie.

Figure 10 shows in diagrammatic fashion the modification employing segmental gears for timing.

Fig. 11 is a detail illustrating a portion of a flap in open position.

In order to facilitate the description and the following of the description as respects the individual parts, we have chosen to designate all parts connected with a given mechanism by numerals of the same group. Thus numerals below 100 apply to the baling mechanism per se, numerals of the 100 group apply to the wire tying device or twister mechanism per se, numerals of the 200 group apply to the needle means per se embodying particularly the needles and their mounting, numerals of the 300 group apply to the primary timing mechanism which has to do especially with the control of the needle movements, numerals of the 400 group apply to the metering device, the central element of which is the metering wheel, numerals of the 500 group apply to the plunger latch mechanism, numerals of the 600 group apply to the needle drive mechanism, numerals of the 700 group apply to the twister drive.

The twister

Figure 4 is the outstanding delineation of the twister mechanism. This twisting mechanism 100 is mounted in the plunger 30 of the baling machine. Plunger 30 reciprocates in the bale case 20 which case is comprised of side walls 21 and top and bottom walls 22. The top and bottom walls 22 in the vicinity of the tying mechanism and opposite the plunger in its forward extremity of movement, are slotted as at 23 to permit the passage therethrough of the needles and the wire loops which they carry. Plunger 30 is operated from connecting rod 31 which is reciprocated from the power drive of the baler (by means not shown) and effects driving connection with the plunger through connecting rod pin 32 and journal 33. Pin 32 is seated by its opposite ends in heads 34 welded to the side wall members 35 of the plunger 30. The front 37 of the plunger carries the wad retaining fingers 40. The plunger is vertically slotted as at 39 to permit passage of the needles therethrough, and these slots open also through the front of the plunger to permit the free passage of the wire ties to the ends of the bales. The front openings are normally closed by the flaps 41 hinged on one side to the face of the plunger by hinge ears 50 and biased to slot closing position by springs 43. These flaps minimize the penetration of hay and dust into the plunger interior. The ends 44 (Figure 5) of each of the flaps 41 are converged toward each other from the hinge line and slightly forwardly curved so as to permit the wire ties to slip freely thereon as the wire loops open the doors as the plunger commences withdrawal.

The housing 101 of the twisting mechanism is supported from the side wall members 35 by means of its main drive shaft 102. This shaft is journalled at one end in a bearing member 103 welded to the wall 35, while at the other end it is journalled in an extended bracket 104 bolted to the corresponding side wall 35. Both bracket 104 and the right hand end of shaft 102 and housing 101 which are journalled within it in concentric relation, project through the side of the plunger and through a slot 50 in the side of the bale case 20 where they enter into relationship with shifting and driving means for the twister mechanism. These latter are presently to be described.

Spaced forwardly projecting portions of housing 101 carry the twister gears in the medial horizontal plane of the plunger. They are supported from the front wall 37 of the plunger by means of projecting ribs 105 which are borne in a slot between rails 106 secured to the wall 37. Thus housing 101 and the gears which it contains can be moved transversely of the plunger, sliding on the shaft 102 and on the rails 106 to bring the twister gears into relationship with the wire strands to be twisted.

The twister gears themselves are denominated 107. There are two pairs of them. The slots into which the strands to be twisted are laid are all pointed the same direction toward the right hand side of the machine, and the slots of the pairs are spaced apart by the distance between the sides of the wire loops to be twisted together. The shaft 102 is normally maintained stationary by spring loaded detent 120 projecting radially into a recess in said shaft as in Figure 4, whereby the twister gears 107 will normally be maintained with their slots positioned as in Figure 4 to operatively receive the wires from the needle mechanism. Gears 107 are flanked at op and bottom by bearing portions 108 (Figure 9) as usual in this type of gear, which bearing portions have complemental journals formed in the housing 101. The journal portions of the housing are almost closed about the gears, but are open on the side toward the wire strands so as to admit them to the twisting slots. Immediately behind each one of these twister gears and meshing with it is a pinion 109 meshing with the twister gear 107 and mounted on a journal 110 in the form of a small pintle which in turn is borne in bearings in the housing 101. (See Figures 5 and 9 in this connection.) Pintles 110 have on their lower ends bevel gears 111 in mesh with bevel gears 113 on the opposite ends of a through running shaft 112 also journalled in the housing 101. The rear end of shaft 112 carries a bevel gear 114 which meshes with a gear 115 splined slidably on shaft 102. Gear 115 has a fixed relation to the portion of the housing which contains it so that when the housing 101 is slid on shaft 102 the gear moves over its spline 116 with the housing. Gear 115 is considerably larger than the gear 114 preferably twice the diameter, whereby one revolution of shaft 102 drives shaft 112 and hence the twister gears 107 two revolutions.

The arms of housing 101 which contains the twister gears lie each of them on the left hand side of its associated needle slots 39 of the plunger when the twister gears are disengaged from the strands to be twisted, and so away from the paths of the needles (see Figure 4). These arms of the housing are cut away intermediate the gear containing portions in order to straddle and clear the needles when the twister gears are in position about the wires to be twisted.

Twister shifting mechanism

In order to shift housing 101 and the gears 107 to bring them into twisting engagement with the wire strands, the end of the housing 101 surrounding shaft 102 which projects outside of the bale case is provided with a forwardly projecting pin 130, which pin projects through a slot 133 in bracket 104 into engagement with the lower end of an operating lever 132 projecting through hole 131 in the levers end, whenever the plunger, as clearly shown in Figures 3, 4, and 8, is substantially in its extreme forward position. In furtherance of this engagement, pin 130 has its front end tapered as in Figure 4. Lever 132 is pivoted at 134 on bale case 20 and extends vertically upwardly along the right hand side of the casing to be operated from slot cam 135 in the periphery of a disc carried by the needle drive 600 through engagement of a follower 136 at its upper end in the slot cam. When its upper end is moved by the cam 135 its lower end moves the housing 101 and the gears 107 through the pin connection 130 which reaches to it through the slot 133 in the bracket 104. The relationship of the cam 135 to the needle drive mechanism 600 will become apparent upon an understanding of this latter mechanism.

The needle mechanism

The loops to be jointed together are projected into overlapped relationship before the twister gears 107 as appearing in Figure 4 and Figure 5 by means of the needle mechanism 200. This mechanism comprises a pair of upper needles 201 carried by an upper needle yoke 203 and a coacting pair of lower needles 202 carried by a lower needle yoke 204, which needle yokes are respectively secured by pivotal mountings 205, 206 (Figures 1 and 2) to the sides 21 of the bale case 20. The pivotal mountings 205, 206 are spaced some inches apart and the yokes 203, 204 are geared together on each side of the case through segmental gears 207, 208 for simultaneous operation in opposite directions.

The upper needles and the lower needles are mounted upon the yokes by means of split collars 220. These collars preserve the angular relation of the upper and lower needles to the bodies of the yokes by means of keys 221. However, while the lower needles 202 are fixed against movement transversely of the bale case through set screws 222 which bear upon the keys 221, the upper needles 201 are arranged to have a limited movement on the bight of the yoke and transversely of the bale case through the omission of set screws 221 and the provision of such interfitting between the keyways and the key 221 as admits relatively free sliding movement of the collars 220 upon the bight. This movement is brought about by a spring 225 encircling the bight between the needles and urging them apart. Their greatest distance apart is limited by collars 226 adjustably fixed upon the bight. They are urged together against the pressure spring 225 by means of forked cams 230 borne by base pieces 231 upon the top of the bale case, and acting upon complemental collars 227 borne by collars 220. The positional relationship between the collars 226 fixed in position on the bight, the shapes of the interacting members 227 and 230, and the main bodies of the upper and lower needles 201, 202 are such that when the cam collars 227 are all the way out and against the fixed collars 226, the bodies of the needles 201, 202 occupy the relative positions shown in Figure 8, but when the needles are all the way in and the bight portion of the yoke 203 is all the way down toward the top of the bale case, the cam members 227, 230 engage in the extreme, and the bodies of the needles 201, 202 occupy the relative positions shown in Figure 9, and the points of the needles which bear the loop guiding rollers 235 lie so closely together that the wire strands 241, 240 of the lower and upper wire loops respectively lie closely adjacent or contiguous to each other. The twister gears can then engage them more readily and efficiently.

The wire loops 240, 241 are projected downwardly from the top and upwardly from the bottom of the bale case directly from the respective spool leads 242, 243 which extend from spools 245 (only one such spool is shown) over wire guides 246 and (prior to engagement by the needles) around the bale by way of the interstices between the leads which previously have been made for the forward end of the bale.

The needle mechanism 200 also embodies the wire cutters 250. These comprise notched cutting blades riveted or otherwise secured to the bodies of the respective upper and lower needles 201, 202 in such position that when the needles are lying close together as shown in Figure 9, the cutting notches 252 lie in the plane of the loops 240, 241 and the ultimate ties between them. As the needles approach the position in Figure 9 these cutters 250 ratchet past the respective bights 253 of the loops 240, 241 by way of the inclined undersides 251, thus, reaching their cutting positions without consequential interference with the bights of the loops, the cutter 250 attached to the upper needle 201 lying just below the bight 253 of loop 241 of the lower needle, and the cutter 250 attached to the lower needle lying just above the bight 253 of the loop 240 of the upper needle. So soon as needles 201, 202 commence their withdrawal movement, the bights 253 are engaged in the cutting notches 252 and the loops are quickly severed at the points of engagement, thus severing the wire ties from each other.

The primary timing mechanism

This mechanism is designated at large by the numbers 300. It consists of a continuously rotated sleeve 301 (Figure 2) journalled in a main bearing 319 carried from the top of the bale case together with a central through running timing shaft 302 in turn journalled in the sleeve 301. Sleeve 301 and shaft 302 are not normally connected together but may be connected at will through a one revolution and stop clutch 303 which we may denominate a needle clutch. The outer member of this clutch is connected rigidly with the sleeve 301 and is constantly driven from a source of power (not shown) by means of a chain 325 and sprocket 326. Sleeve 301 is also connected rigidly with a twister driving clutch comprised of driving and driven members 304 and 308. These members are interconnected through driving springs 306, bearing member 305 and a brake friction lining 307. Driven member 308 connects with a sleeve 309 which in turn drives the twister mechanism 700 through a hollow shaft 710 which encompasses the needle drive shaft 302. The driven members 308, 309 of the twister clutch are normally prevented from rotating by means of a detent 310 borne on a sleeve 311 in turn journalled on a shaft 312 and engaging over the outer end of a lug 313 projecting from the periphery of the member 308. Shaft 312 is borne loosely in bearings 314 attached to the top of the bale case and sleeve 311 is in turn journalled loosely on shaft 312 such that there may be oscillation of either the sleeve or the shaft. The end of sleeve 311 opposite the end which bears the detent 310 carries an arm 316 the outer end of which is operated upon by a cam 317 borne on shaft 612 of the needle drive mechanism 600 and provided with a projecting operating portion 318. A spring 320 acting on a short arm 321 projecting from sleeve 311 biases the detent 310 into engagement with the lug 313, while the cam portion 317 acting on the end of the arm 316 is of such shape that, as shaft 612 rotates to the position shown in Figure 7 it will momentarily move detent 310 off of the lug 313 but immediately return it to the path of the lug, so to permit but one revolution of clutch member 308 for each actuation by the cam 317. Thus, the friction clutch constituted by elements 304 to 308 functions as a rotatable slip connection which is made to serve the end of timing the twist.

The first mentioned clutch 303 on the other hand is the means of timing the needle drive mechanism 600. This clutch 303 instead of being a friction clutch is a dog clutch of the one revolution and stop clutch type. The dog controlling its movement is designated 331. The type of clutch is so well known and the function of the dog so well understood that it is not necessary to disclose the details of the clutch. (For more intimate details of either this clutch 303 or the twister clutch just described reference may be had to the co-pending application of E. B. Nolt, Serial Number 268,424, filed January 26, 1952. Suffice it to say here that when the dog 331 is stopped from rotating its driven member ceases rotating. The ultimate driven member in this case is the gear 610 on the shaft 302 for this gear is fixedly connected with that member of the clutch which carries the dog 331. Normally this dog 331 is engaged against counterclockwise rotation (see Figures 1 and 6) by the outer end of an arm 330 which is keyed to the shaft 312 previously described in connection with the twister clutch control mechanism. Oscillation of this shaft 312 in a counterclockwise direction will disengage the arm 330 from the dog 331 and engage the clutch. A second means normally preventing clutch rotation through engagement with dog 331 is the upturned end 335 of a lever 332 borne on the outer end of a shaft 337 journalled in bearing 336 from the top of the bale case. The one restraining arm 330 is operated from the metering wheel mechanism 400 while the other arm 332 is operated from the plunger latch mechanism 500.

The metering wheel mechanism

This mechanism as most clearly appears in Figures 1 and 2 comprises the metering wheel per se 410 and journals 411 supporting it from the top of the bale case. The wheel itself projects through an aperture 412 in the top of the bale case where it engages the top of a bale to be driven thereby. A pin 415 borne on the body of the wheel 410 operates through a long bar or rod 416 with that portion of the mechanism to control the clutch 303 through the arm 332. The rear end of this bar 416 normally overlies and rests by one or another of its two underside jogs upon the top of a roller 418 borne at the upper end of a crank arm 419 keyed to the shaft 312.

Referring also to Figure 6 in conjunction with Figures 1 and 2 it will be seen that with the parts in the position shown, a bale just having been completed and the needles having been entered to make the ties required, the wheel is in the position in which pin 415 is in its extreme rearward position, the parts are in the position in which they will commence a new metering cycle. Thus as metering wheel 410 rotates pin 415 will draw bar 416 forwardly until the second jog leaves the top of roller 418 and the rear end of the lever drops to the first jog 417 thereby to place the vertical wall 421 of that jog forwardly of the roller 418. Therefore when the metering wheel returns pin 415 to the position shown it will push by wall 421 upon the roller 418, so moving arm 330 counter clockwise and downwardly and releasing clutch 303 for one revolution, thus driving the needles to the position indicated. During such single revolution of the clutch 303 each of a pair of pins 425 carried by the cam member 317 at diametrically opposite points is adapted at but half revolution of the member 317 to engage the under side 426 of bar 416 and lift the bar far enough to free the roller 418 from engagement with the wall 421 of the first jog. This happens just as the parts approach the position shown and well before the clutch 303 has completed its revolution. Then spring 422 extending between the arm 419 and the top of the bale case and biasing the arm 419 counterclockwise returns both arms 419 and 330 to their normal positions, those shown in Figure 1, whereupon dog 331 is stopped by the end of lever 330.

The plunger latch mechanism

Referring again principally to Figures 1 and 2 and subordinately to Figures 6 and 3, the central element of this mechanism 500 is of course the latch 510 itself. It is borne from the top of the casing on a rearward pivot 511 in such position that its abutting forward end 512 can be projected through an appropriate aperture in the top of the casing as shown to bear against the rear end of the plunger and lock it in its forward position, while the under side 513 of a frontal projection from the upper end of the abutment end 512 is rested upon the top of the plunger or the top of the bale case to serve as a stop against further downward movement of the latch. A spiral spring 515 entered between an upwardly extending arm 516 formed integrally with latch 510 and the upwardly extending arm 517 of a bell crank 517, 518 keyed to and rocking with the shaft 337, when placed under tension urges latch 510 downwardly to plunger engaging position as shown in Figure 1. This spring 515 is placed under tension through the riding of a roller 520 borne on the rearward end of arm 518 upon a plunger-borne cam 521. As the plunger approaches its forward position it raises roller 520 from its dotted line position to its full line position, and rocks crank 517, 518 clockwise to place the spring 515 under adequate tension to move the latch to its latching position.

This same oscillation of shaft 337 moves the lever 332 of te primary timing mechanism clockwise and moves its forward end 335 downwardly to free the clutch dog 331 from its restraint. Should dog 331 be at the same time freed by the end of lever 330, of restraint from the metering wheel mechanism 400, clutch 303 will then be free to make one revolution and stop. The mechanism for retracting latch 510 from its plunger engaging position consists of a rod 525 connected with the upper end of bell crank arm 516 by a universal joint 526 and at its forward end bearing an abutment 527 in a position to be engaged by the upper end 528 of an arm 529 pivoted to the bale case on axis 531 and actuable through a fixedly connected arm 530 bearing a cam follower 535 at its outer end in a position to engage the periphery of a cam disk 537. The rod 525 has its forward end passed through an aperture in the end 528 and when cam follower 535 is pressed to the periphery of the cam disk 537 by the urge of a powerful spiral spring 538 acting on the arm through arm extension 439 and latch 510 is in, end 528 rides forwardly of abutment of 527 an appreciable distance. However, when the notch 536 in the periphery of the disk 537 reaches follower 535, the follower drops into it, and the spring 538 impacts the end 528 against the abutment 527 and overpowers spring 515 to retract the latch 510.

The needle drive mechanism 600

This mechanism emanates from the primary timing mechanism at the clutch 303 through gears 610, 611, the latter of which is substantially twice the diameter of the former whereby the shaft 612 of the needle drive mechanism makes but one half of a revolution during one complete revolution of the one revolution and stop clutch 303. Shaft 612 is borne in bracket bearings 613 from the top of the bale case. Intermediate its ends it carries the cam discs 317 and 537 previously described in connection with the primary timing mechanism and the plunger latch mechanism respectively. Near its right hand end it carries the cam 135 described in connection with the twister mechanism. At its opposite extremities it carries cranks 615 which through pitmans 616 connect with crank arms 617 (see Figures 1 and 2) which are rigidly connected with the upper needle yoke 203 about its bale case pivots 205. Thereby when the needle drive shaft 612 makes its first half revolution under the first one revolution and stop of clutch 303 of the timing mechanism, the needles are driven into their innermost positions, those illustrated in Figures 1 and 5, and when upon the next ensuing revolution and stop of clutch 303 drive shaft 612 makes another half revolution, so returning to its initial position, and returns the needles to a normal rest position (not shown) outside of the bale case altogether.

The twister drive mechanism 700

It will be remembered that the twister drive shaft 710 is a tubular shaft which surrounds the shaft 302 of the primary timing mechanism. On the right hand end of this shaft is a beveled drive gear 711 guided in the gear housing 713 in mesh with a coacting bevel gear 720 of half of its diameter carried in the same housing. Housing 713 preferably emanates from and is supported by the bearing 714. A diagonally downwardly and forwardly extending shaft 721 carries at its lower end a bevel gear 722 (refer now especially to Figure 3) located in a bracket housing 723 rising from a base 725 supported from the side of the bale case. Bevel gear 730 mounted in the housing 723 is provided with a shank 731 projected rearwardly from the housing and provided with a square socket 732 on a horizontal axis. A gear housing 735 extended from the bracket 104 of the twister gear mechanism drive shaft 102 previously described, journals a stub shaft 737 whose projecting end 738 is squared and tapered complementally to the squared socket 732 in such manner as to enter the socket 732 when the plunger is in the forward position shown in Figure 4 and effect a coupling connection with the gear 730. Gears 740 and 741 in the housing 735 respectively upon the ends of shaft 737 and shaft 102, complete the twister drive connection from shaft 710 associated with the primary timing mechanism 300 to the twister mechanism 100 through its shaft 102. The gear ratio of gears 711 and 720, and 722 and 730 are different, the former being two to one and the latter one to one. However, it will be remembered that the gear relation of gears 115 and 114 of the twister mechanism is a two to one relation. Thereby the relationship between drive shaft 710 and the twister mechanism per se becomes a four to one relation. Keyed to the outer end of the shaft 102 between the inner wall of the housing 742 and the bevel gear 741 is a disc 744 of relatively large diameter provided with a single socket into which there projects when the parts are in the position shown and the wire slots in the twister gears 107 are truly transverse, a spring borne pin 745, the function of which is to maintain the twister gears 107 in the position shown so long as the mechanism is idle.

Operation

In Figures 1 to 7 the parts of the mechanism are shown in the positions they occupy just after a bale has been completed, when the plunger has been latched in its forward position following its compression of the last wad of the bale, and the needles have been taken to their innermost positions, just before the twisting mechanism is to engage the wire strands to effect the wire ties. The needles present the wire strands of the loops 240, 241 in position before the twister mechanism and ready to be engaged in the twister gear slots when the twister gears 107 are moved forwardly.

Normally as is apparent to those well versed in the art the needles 201, 202 lie outwardly of the top and the bottom of the bale case with their loops engaging rollers 235 free of the longitudinally extending wire strands which are to form the sides of the tie 242, 243 about the bale. When the needles are in this idle position externally of the bale case, the metering wheel 410 has not yet pushed the end 421 of bar 416 (see Figure 6) against the roller 418 (which at the time underlies the overhanging extremity 417 or bar 416) or else has not pushed the roller 418 far enough forwardly to disengage the end of lever 330 from the dog 331 of the clutch 303, and so this one revolution and stop clutch has not yet made a revolution. When, however, the metering wheel 410 in its counterclockwise movement reaches the position shown in full lines in Figure 1 the counterclockwise movement of roller 418 is sufficient to disengage lever 330 from the dog 331. Even though this takes place, however, dog 331 is not released for movement until or unless the plunger 30 has reached its extreme forward position, for in all other positions of the plunger the end 335 of lever 330 which is actuated from shaft 337 as oscillated in a clockwise direction under the urge of cam roller 520 bearing on cam 521 is hooked behind the dog 331 along side of the lever 332. Clutch 303 therefore is released for its first revolution and stop at the extremity of the forward stroke of the plunger which follows movement of the end of lever 332 away from dog 331. The revolution of clutch 303 driving gears 610, 611 affects but one-half revolution of the needle drive shaft resulting in the drive of the needles toward their innermost positions shown before clutch 303 is stopped. At the inception of revolution follower notch 536 moves out from under follower 535 and the plunger latch 510 locks the plunger forward. Before the revolution is more than a fraction completed one of the pins 425 carried on the cam disc 317 revolved with the needle drive shaft 612 in its clockwise rotation engages the under side 426 of bar 416 raising it to and slightly beyond the level shown in full lines in Figure 1 thus permitting the lever 419 (see Figure 6) to be moved counterclockwise under the urge of spring 422 and so again bring the outer end of lever 330 in the path of counterclockwise movement of the dog 331 so stopping clutch 303 at the end of its first revolution.

With the parts in the relationship shown in Figure 6 and just before the clutch comes to a stop (the dog 331 is shown a fraction of an inch away from the end of lever 330), the cam formation 318 on the periphery of the cam disc 317 which bears the pins 425 on its opposite side, engages the end of the bell crank 316 of the twister clutch control mechanism and rocks the bell crank clockwise to disengage the end 310 of the mating arm 314 from the lug 313, so to permit the twister clutch to drive the twister gears through one revolution. As clearly shown in Figure 7, this movement is just about to effect complete release. Just as clutch 303 completes its movement it will have effected this complete release of the twister clutch and the revolution of the twister drive mechanism will have commenced. So soon as this commences the detent 310 is snapped back to a position in the path of the lug 313 by the biasing spring 320 and is ready to re-engage lug 313 upon the completion of one revolution of the twister clutch.

Just prior to this action of the parts shown in Figure 7 however, the slotted cam 135 will have engaged the cam follower 136 on the upper end of the twister gear shift lever 132 and through the pin connection 130 with the twister gear housing 101 (see Figure 4) shifted the twister gears enbloc sufficiently toward the right hand side of the machine to bottom the crossed strands of the upper and lower wire loops 240 and 241 in the slots of the twister gears. The half revolution of the shaft 612 resulting in the innermost positioning of the needles comes to a stop with the follower roller 133 lying at the top of the hump of the offset in the slotted cam 136 and the timing is such that this stop position has been reached just before detent 310 releases the twister clutch.

The relation of the wire strands to the twister gears 107 and to each other at this juncture is shown in Figure 9. This relation it will be remembered has been brought about by virtue of the shift of the needles laterally toward each other, from the position shown in Figure 8 to the position shown in Figure 9, brought about by the interengagement of the forked cam 230 and the cam collar 227 associated with the upper pair of needles 201 as shown in Figures 2 and 5. Thus the needles are far from enough apart laterally as they approach each other to enable the rollers 235 which bear the loops to pass each other, and thus after they pass they bring the strands into close adjacency. This close adjacency is furthered by the conical shape of the engaging surfaces of the rollers, which shape bears the bights of the loops toward each other and toward the thinner of the two side flanges 236. In this position the knives 250 have ratcheted by their inclined under sides 251 past the bights of the loops and lie with their cutting notches 252 in the plane of the loops ready to sever the loops as the needles draw apart after the ties have been made.

The ensuing single revolution of the twister gear clutch rotates the twister gears 107 through four complete revolutions whereupon the twister clutch is brought to a stop suddenly by the re-engagement of the lug 313 with the under side of detent 310. These four revolutions of the twister gears cause them to simultaneously form double-twist wire ties. The two twists (one on each side of the twister gear) in each case are constituted by four turns of the wire in one and the same direction. One of the ties for the end of the completed bale and the other for the forward end of the bale newly to be commenced are thus simultaneously completed.

Just as these ties are being completed (as the last of the four revolutions of the twister gears 107 takes place and the last twist is being concluded) a cam lug 432 on cam surface 431 borne by sleeve 309 of the twister clutch engages and depresses the outer end of lever 430 keyed to shaft 312 to rock shaft 312 once more counterclockwise sufficiently momentarily to free its arm 330 from the dog 331, whereupon needle clutch 303 launches upon a second one revolution and stop and needle drive shaft 612 launches upon its second half revolution. Immediately following this launching, the cam 432 ratchets past the end of lever 430 to drop lever 430 into the full position shown in Figure 6. Thereupon lever 419 rocks back clockwise under the urge of spring 422 (bar 415 being prevented from dropping behind roller 418 by reason of its continuing engagement with pin 425 which engages under its bottom 426) so that clutch 303 may not make more than one more revolution. The first movement of shaft 612 initiates withdrawal of the needles and moves the cam follower 133 off of the hump on cam 135, this reversal rocking the lever 132 and moving the twister gears to the left and free of the completed wire ties. The needles early in their withdrawal movement engage the cutters 250 with the bights 253 of the wire loops, and sever them thus separating the two wire ties from each other. The ties are then free, the one to drop to the end of the completed bale and the other to constitute a new bale loop.

At this juncture the plunger 30 is still at rest in its forward position, held there by the latch 510 of the plunger latch mechanism 500. When, however the needles are completely withdrawn and approach their position of rest (needle clutch 303 having almost completed its revolution) follower 535 of the bell crank 530, 528 drops into the hollow on the periphery of the cam disc thus releasing the bell crank for movement counterclockwise under the urge of an overpowering spring 538. End 538 engages with the abutment 527 on the rod 525 and moves the latch 510 counterclockwise against the initial bias of spring 515 to the dotted line position, so freeing the plunger to resume its reciprocation as its telescoping connecting rod re-effects connection.

*Modified timing mechanism*

In Figure 10 of the accompanying drawings there is diagrammatically illustrated a modified form of tying mechanism adapted for use in the preferred embodiment in place of timing mechanism there shown, and employing segmental gears for the timing function.

This modified timing mechanism is similar to the timing mechanism of the preferred embodiment in that the normally stationary timing shaft 302 is driven by a one revolution and stop clutch under the control of a metering mechanism, all as described, in the preferred embodiment. However, unlike the preferred embodiment, the timing shaft 302 and clutch of the modification require but a single revolution to accomplish a complete tying cycle.

To this end there is keyed on the shaft 302 a segmental needle drive gear, the toothed portion 350 of which extends two-thirds of its circumference or for 240° around its periphery, the remaining one-third thereof being interrupted or smooth as at 351.

Drive is transmitted from the toothed gear segment 350 to the needle drive shaft 612 through gear 650. The circumferential extent of the toothed portion 350 equals the circumference of gear 650 to transmit thereto one complete revolution for each revolution of the shaft 302.

Normally when the needles are withdrawn from the bale chamber between twisting operations, the gear 650 meshes with the mid-point of the toothed gear segment 350, at 120° from either end thereof.

Thus, when the metering mechanism actuates the one revolution clutch to cause a rotation of the shaft 302 in a counterclockwise direction (as shown by the arrow in Figure 10) the first or bottom half or 120° of the toothed segment 350 first rotates in mesh with gear 650 to rotate same for one-half a revolution and thereby insert the needles into the bale chamber to the position shown in Figure 5. Toward the latter part of this half revolution, the slot cam 135 on shaft 612 cooperates with the follower 136 and lever 132 to move the twisters toward the right, whereby the twisters 107 are made to receive the sides of the wire loops carried by the needles, as in Figure 5.

A segmental twister drive gear 361 keyed on the timing shaft 302 has a toothed portion 360, for a third of its circumference, positioned to mesh with driven gear 760 on the twister shaft 710' during the second one-third revolution or 120° movement of the timing shaft. During such second one-third revolution of the timing shaft 302, the needle shaft 612 will remain stationary to maintain the needles and wires in the operative position of Figure 1, while the twist is made, it being apparent that the smooth or uninterrupted portion of gear 351 will be moving opposite the needle drive gear 650 at this time.

At the beginning of the last one-third revolution, the toothed segment 360 of gear 361 will have completed the twist and moved out of engagement with the twister gear 760, and the toothed portion 350 of gear 351 will have just commenced to reengage with driven needle gear 650. During this final one-third revolution, the rotation of the last gear half of gear segment 350 in mesh with the gear 650 will cause the final half revolution of the needle shaft 612 to retract the needles from the bale casing. At the same time, the coaction of the slot cam 135 on needle shaft 612 with the cam follower 136 will actuate the lever 132 to return the twister housing and gears to their original positions in the same manner as in the preferred embodiment.

In order to maintain the twister drive gear 760 and thus the twister gears themselves, in fixed positions between the various twisting cycles, a disc 761 keyed on the shaft 710 may have an arcuate peripheral depression 761 adapted to conformingly receive and ride along an axially off-set peripheral flange coextensive with the smooth portion of the twister drive gear 361, all in accordance with usual practice.

Following completion of the tying cycle, the several parts of the timing mechanism will come to rest in the positions of Figure 10, in readiness for repeated tying cycles.

Having thus described our invention, we claim:

1. In an automatic baler comprising a bale case and a reciprocating plunger, a two-spool wire tie mechanism comprising a pair of coacting needles engageable with the spool strands and projectible into and out of the bale case and plunger respectively from opposite sides thereof to positions in adjacent planes within the plunger to form wire loops the corresponding sides of which overlap each other as pairs, wire twisters borne by the plunger and engageable with each such pair, means for projecting and withdrawing the needles, and means for rotating the twisters to join the overlapped loop sides together.

2. A two-spool wire tie mechanism according to claim 1 in which the twisters borne by the plunger are reciprocable transversely of the plane of the wire loops to engage the wire pairs, together with means external to the plunger and coupled to the twisters when the plunger is in a forward position to bring about their said reciprocation.

3. A two-spool wire tire mechanism according to claim 1 including a bale metering means, and in which the means for projecting and withdrawing the needle and the means for rotating the twister each embody a one revolution and stop clutch, the needle operating clutch being separately under the control of the bale metering means and of the revolution of the twister clutch, and the twister clutch being under the control of the needle clutch.

4. A two-spool wire tie mechanism according to claim 1 including a bale metering means, and in which the needle operating mechanism is jointly under control of the twister rotating means and the bale metering means.

5. A two-spool wire tie mechanism according to claim 1 in which the means for rotating the twisters is mounted on the bale case and connected with the plunger borne twisters through a rotatable slip connection which permits free reciprocation of the plunger.

6. A two-spool wire tie mechanism according to claim 1 in which the plunger is formed with slots through which the needles project said slots having their forward ends normally closed by dust protecting hinged flaps which open forwardly to pass the wire ties out of the slot when the plunger is retracted.

7. A two-spool wire tie mechanism according to claim 1 in which the plunger is formed with slots through which the needles project said slots having their forward ends normally closed by dust protecting hinged flaps which open forwardly to pass the wire ties out of the slot when the plunger is retracted, the ends of each of the flaps being converged toward each other and the free edge of the flap.

8. A wire tie mechanism as set forth in claim 1 including means for locking the plunger at the end of its advance stroke during actuation of the tying mechanism.

9. A wire tie mechanism as set forth in claim 1 in which means is provided for locking the plunger at the end of its advance stroke during actuation of the tying mechanism.

10. A wire tie mechanism as set forth in claim 1 in which the twisters are borne interiorly of the plunger and means are provided for immobilizing the plunger with said twisters in position to cooperate with said needles during a tying cycle.

11. In an automatic baler comprising a bale case and a plunger reciprocating therein, a wire twister carried interiorly of said plunger, needles mounted on opposite sides of said bale case for projection through the sides of such bale case and plunger into operative relation in said twister, means for projecting and withdrawing said needles into and from the plunger, and means for immobilizing said plunger in a position wherein said twister is located for coaction with the needles during such projection and withdrawal of the needles.

12. An automatic baler comprising a bale case, a plunger reciprocating therein, a wire twister carried by said plunger, bale length metering means, latch mechanism controlled by said metering means for locking the plunger in its advance position, and needle means normally located outside of said bale case for carrying a portion of a bale tie into said twister while the plunger is thus locked in advance position.

References Cited in the file of this patent

UNITED STATES PATENTS

| | | |
|---|---|---|
| 761,305 | Johnson | May 31, 1904 |
| 1,152,209 | Patterson | Aug. 31, 1915 |
| 1,180,934 | Mottier | Apr. 25, 1916 |
| 1,232,643 | Wygant | July 10, 1917 |
| 1,237,608 | Burgess | Aug. 21, 1917 |
| 1,268,444 | Ezell | June 4, 1918 |
| 1,889,372 | Nolan | Nov. 29, 1932 |
| 2,548,559 | Ronning et al. | Apr. 10, 1951 |